(12) United States Patent
Pozzobon

(10) Patent No.: US 6,312,246 B1
(45) Date of Patent: Nov. 6, 2001

(54) APPARATUS TO PRODUCE PASTA

(75) Inventor: Silvano Pozzobon, Trevignano (IT)

(73) Assignee: Simac-Vetrella SpA, Cazzago di Pianiga (IT)

( * ) Notice: Subject to any disclaimer, the term of this patent is extended or adjusted under 35 U.S.C. 154(b) by 0 days.

(21) Appl. No.: 09/744,807

(22) PCT Filed: Jul. 6, 1999

(86) PCT No.: PCT/IB99/01246

§ 371 Date: Jan. 30, 2001

§ 102(e) Date: Jan. 30, 2001

(87) PCT Pub. No.: WO00/05965

PCT Pub. Date: Feb. 10, 2000

(30) Foreign Application Priority Data

Jul. 30, 1998 (IT) .............................................. UD98A0138

(51) Int. Cl.[7] .............................. A21C 1/02; A21C 1/14; A21C 3/04; B29B 1/06; B29C 47/38

(52) U.S. Cl. ............................. 425/190; 99/348; 99/353; 366/98; 366/314; 425/151; 425/197; 425/205

(58) Field of Search .............................. 99/330, 348, 353, 99/403–418; 366/98, 314; 425/190, 151, 197, 205

(56) References Cited

U.S. PATENT DOCUMENTS 4,219,318 * 8/1980 Cavalli .................................. 425/190
4,391,575 * 7/1983 Osro ..................................... 425/190
5,401,159 * 3/1995 Hsu ...................................... 425/190
5,409,365 * 4/1995 Su et al. ................................. 99/353
5,421,713 * 6/1995 Backus et al. ...................... 99/348 X
5,460,506 * 10/1995 Price, IV et al. .................. 99/348 X
5,486,100 * 1/1996 Hsu .................................... 99/353 X
5,731,012 * 3/1998 Backus et al. ..................... 99/348 X

FOREIGN PATENT DOCUMENTS

0022090 * 1/1981 (EP) .
2021962 * 12/1979 (GB) .

* cited by examiner

*Primary Examiner*—Timothy F. Simone
(74) *Attorney, Agent, or Firm*—Antonelli, Terry, Stout & Kraus, LLP

(57) ABSTRACT

Apparatus to produce pasta used in particular, but not exclusively, in the domestic field, comprising a box-like structure (11), a mixing assembly (12) and an extrusion assembly (13), the mixing assembly (12) comprising a receptacle (16) inside which a mixing organ (18) is commanded to rotate and the extrusion assembly comprising at least a feeding screw (32) and an interchangeable extruder (31), the mixing assembly (12) and the extrusion assembly (13) being assembled in a removable manner on the box-like structure (11), the mixing assembly (12) being equipped with an outlet aperture (26) suitable to couple in an air-tight manner with an inlet aperture (28) of the extrusion assembly (13).

8 Claims, 3 Drawing Sheets

APPARATUS TO PRODUCE PASTA

FIELD OF THE INVENTION

This invention concerns an apparatus to produce pasta, as set forth in the main claim.

The apparatus according to the invention is suitable to be used particularly, but not exclusively, in the domestic field to prepare different types and shapes of pasta.

BACKGROUND OF THE INVENTION

The state of the art includes apparatus used in the domestic field to prepare pasta of different types and shapes, such as spaghetti, macaroni, gnocchi, bread-sticks, biscuits, pizza, flaky pastry or otherwise.

Such devices generally comprise a receptacle, or basket, into which the desired ingredients are poured to be amalgamated together by means of a rotary blade.

The receptacle co-operates at the lower part with an extrusion chamber comprising a feeding screw suitable to convey and push the dough against an interchangeable extruder defining the type and shape of the pasta.

Such devices as are known to the state of the art have shown themselves to be inefficient for various reasons.

First of all they are difficult to clean, as the extrusion chamber is made in a single piece with the box-like structure of the device, or can only be partly dismantled.

In the second case, moreover, the user often finds difficulties in dismantling and assembling the components because of the complicated systems used or because the sequences to dismantle and assemble the components are too complicated or do not respect a pre-defined logical order.

It is difficult, moreover, with conventional devices to produce perfectly amalgamated doughs and to transfer the whole from the receptacle to the extrusion chamber. This is because in conventional devices it often happens that a layer of dough remains on the bottom of the receptacle which is wasted and therefore a longer time is required to clean the receptacle.

Furthermore, with these devices it is difficult to introduce the ingredients inside the receptacle, as the upper cover has to be opened, and therefore the device has to be stopped, or an aperture on the cover has to be used, and the shape does not prevent flour or pieces of the dough from spilling out.

In some cases, moreover, in conventional devices, there have been cases where flour or portions of the dough have infiltrated inside the compartment housing the motor means or electric parts, with a danger of malfunctioning or risks for the user.

Moreover, with conventional devices there is the problem that the dough is distributed to the extruder in an uneven manner.

U.S. Pat. No. 4,219,318 and GB-A-2.021.921 disclose domestic apparatuses for the production of pasta having the features of the pre-characterising portion of claim 1.

However, these documents do not disclose guide and centering means provided on the internal wall of the housing of the apparatus and suitable to cooperate with mating guide and centering means provided on the external wall of the receptacle and extending substantially for the entire height of the receptacle itself. Thus, in these apparatuses, the operations of centering, insertion and extraction of the receptacle in/from the relative housing, and its coupling with the relative extrusion assembly, are rather complicated and cannot be carried out in an easy and fast way.

The present Applicant has devised and embodied this invention to overcome these shortcomings and to obtain further advantages.

SUMMARY OF THE INVENTION

The invention is set forth and characterised in the main claim, while the dependent claims describe other characteristics of the main embodiment.

The purpose of the invention is to provide a mixing apparatus to produce pasta, extremely simple, easy to use and not susceptible to malfunctioning.

Another purpose of the invention is to allow a careful and rapid cleaning by achieving an apparatus with a compact structure but which will make possible to remove, both easily and quickly, all the components and functional parts which come into contact with the ingredients or the dough during the preparation of the pasta.

A further purpose is to allow the preparation of a perfectly homogeneous dough and the passage of all the dough from the receptacle to the extrusion chamber.

The apparatus according to the invention comprises, in its essential parts, a box-like structure with which are associated, in a removable manner, an assembly to mix and prepare the dough, and an extrusion assembly, intercommunicating by means of at least an aperture through which the dough can pass.

The assembly to mix and prepare the dough comprises, in its essential parts, a receptacle which can be closed at the top by a cover and inside which a mixing organ is suitable to rotate, equipped at least with first means suitable to amalgamate the ingredients and second means suitable to push the dough thus produced into the extrusion assembly.

According to a variant, the mixing organ also comprises third means suitable to scrape the dough from the bottom of the receptacle so as to prevent it from depositing there.

The extrusion assembly comprises, in its essential parts, an extrusion chamber co-operating internally with a feeding screw and, at an outer end, with an interchangeable extruder.

According to one characteristic of the invention, the apparatus comprise centering and guide means provided on the external wall of the receptacle and extending substantially for the entire height thereof, these means being suitable to cooperate with mating centering and guide means provided on the inner wall of the housing of this receptacle.

According to one characteristic of the invention, in order to assemble and dismantle the assembly to mix and prepare the dough and the extrusion assembly, the user has to respect a simple sequence suitable which will avoid problems in the functioning of the apparatus and accidental spillages of flour, portions of dough or other ingredients from the receptacle.

BRIEF DESCRIPTION OF THE DRAWINGS

These and other characteristics of the invention will become clear from the following description of a preferred an extrusion chamber co-operating internally with a feeding screw and, at an outer end, with an interchangeable extruder.

According to one characteristic of the invention, the apparatus comprise centering and guide means provided on the external wall of the receptacle and extending substantially for the entire height thereof, these means being suitable to cooperate with mating centering and guide means provided on the inner wall of the housing of this receptacle.

According to one characteristic of the invention, in order to assemble and dismantle the assembly to mix and prepare the dough and the extrusion assembly, the user has to respect a simple sequence suitable which will avoid problems in the functioning of the apparatus and accidental spillages of flour, portions of dough or other ingredients from the receptacle.

BRIEF DESCRIPTION OF THE DRAWINGS

Figure 1:
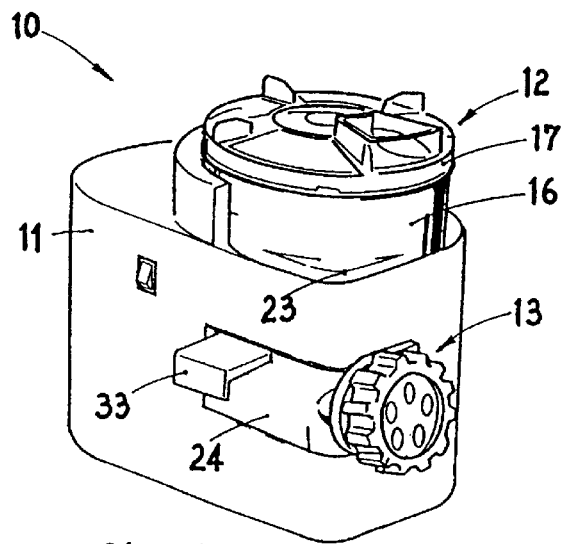
Figure 2:
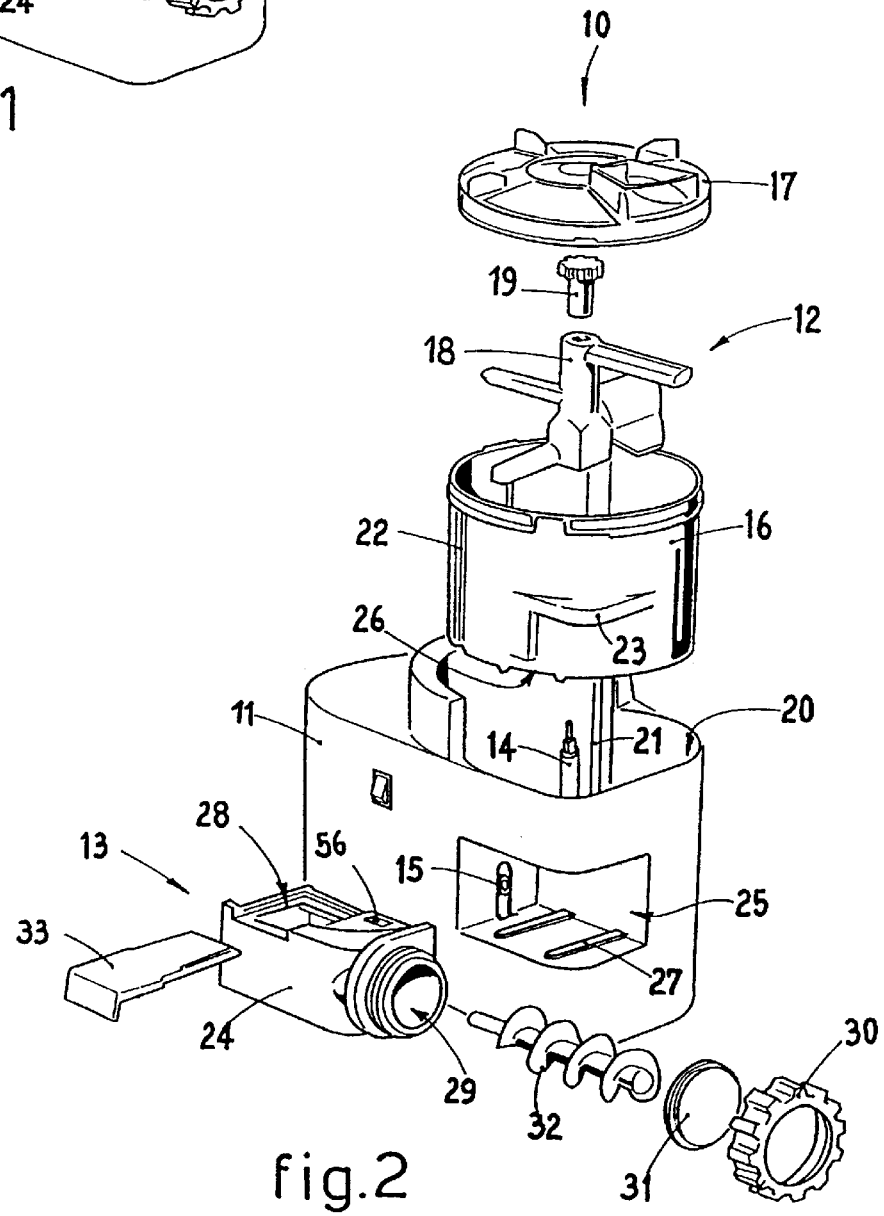
Figure 4:
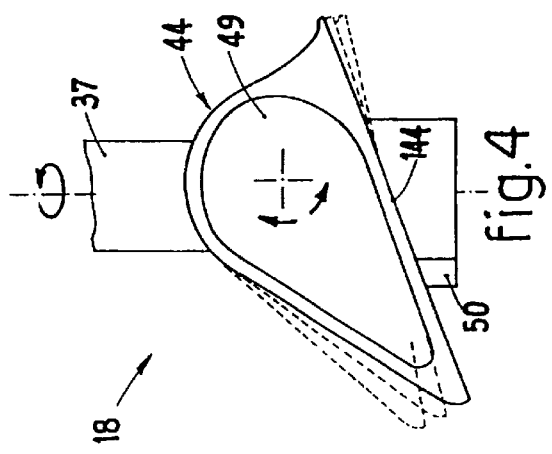
Figure 3:
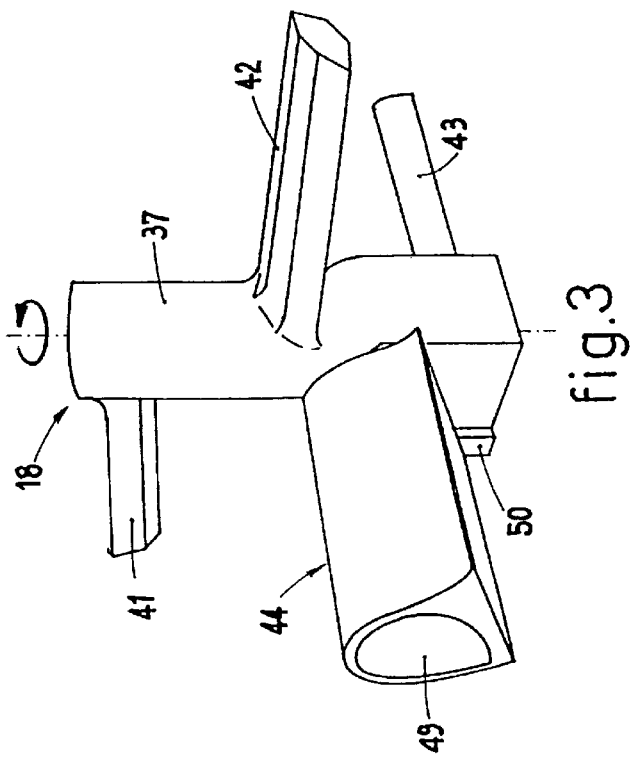
Figure 5:
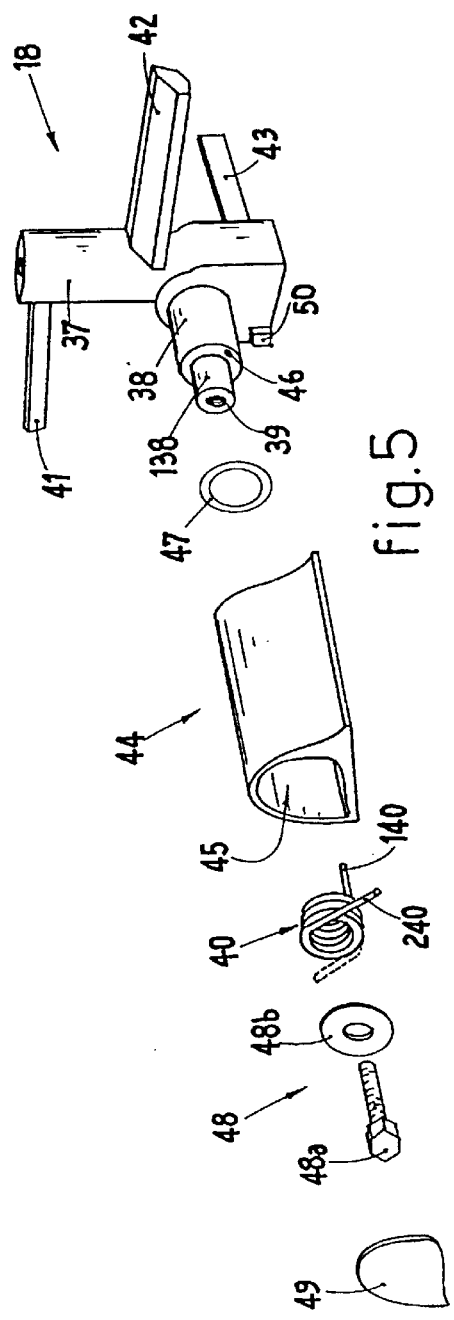
Figure 6:
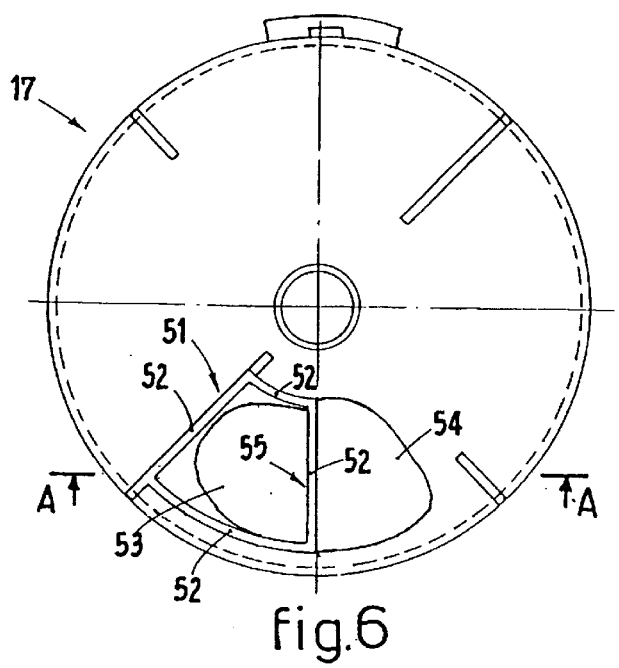
Figure 7:
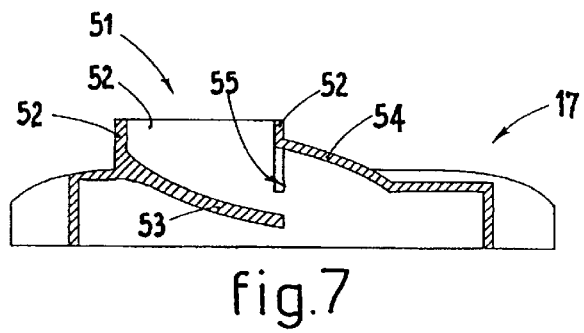
Figure 8:
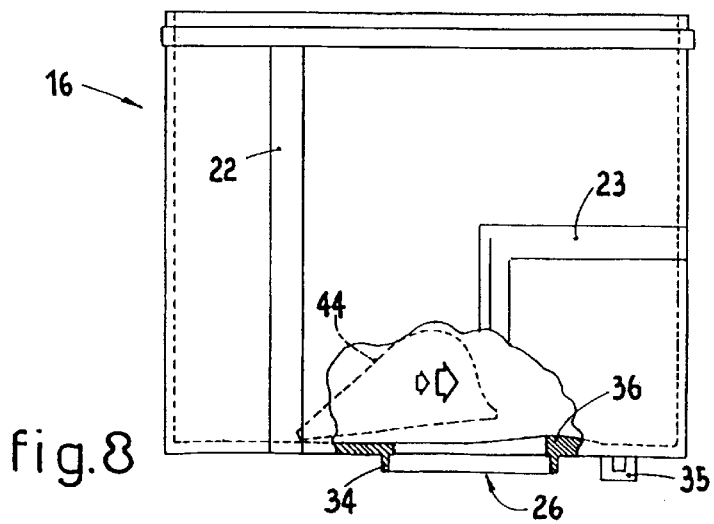

These and other characteristics of the invention will become clear from the following description of a preferred form of embodiment, given as a non-restrictive example, with reference to the attached drawings wherein:

FIG. 1 shows an apparatus according to the invention;

FIG. 2 is an exploded view of FIG. 1;

FIG. 3 shows the mixing organ of the apparatus according to the invention;

FIG. 4 shows an enlarged detail of FIG. 3;

FIG. 5 is an exploded view of FIG. 3;

FIG. 6 is a view from above of the cover of the mixing receptacle;

FIG. 7 shows the section from A to A of FIG. 6;

FIG. 8 is a partly cut-away view of the mixing receptacle.

DETAILED DESCRIPTION OF A PREFERRED FORM OF EMBODIMENT

With reference to FIG. 1, an apparatus 10 according to the invention to produce pasta comprises a box-like structure 11 with which are removably associated an assembly to mix and prepare the dough 12, hereafter simply referred to as the mixing assembly 12, and an extrusion assembly 13.

The box-like structure 11 is suitable to enclose motor organs, of a conventional type and therefore not shown in the drawings, suitable to drive a vertical shaft 14 and a horizontal shaft 15 which can be associated, as will be described hereafter, respectively to the functional parts of the mixing assembly 12 and the extrusion assembly 13.

The mixing assembly 12 comprises a receptacle 16 which can be closed at the top by a cover 17 and inside which a mixing organ 18 driven by the vertical shaft 14 is suitable to rotate.

The receptacle 16 is equipped underneath at the central part with a first through hole inside which the shaft 14 is suitable to be inserted, and peripherally with an aperture 26 suitable to put the receptacle 16 and the extrusion assembly 13 into communication.

The upper end of the shaft 14 is shaped so as to allow a perfect coupling with the inner part of the mixing organ 18 and is equipped with a thread suitable to allow a clamping knob 19 to clamp the mixing organ 18 onto the shaft 14.

According to a first characteristic of the invention, the mixing assembly 12 is suitable to be accommodated inside an aperture 20 in the upper part of the box-like structure 11 (FIG. 2).

The aperture 20 is substantially mating in shape with the outer section of the receptacle 16 and is equipped with protruding elements 21 suitable to lock into mating grooves 22, substantially of the same shape, on the outer surface of the receptacle 16.

In this case, the insertion of the receptacle 16 into the aperture 20 is made easier by the presence on the receptacle 16 of a protruding element 23 suitable to be inserted into a mating shaping of the aperture 20, which functions as a centering element.

The receptacle 16, moreover, is equipped on its bottom with a protruding element 35 suitable to retain the extrusion assembly 13, as will be described hereafter.

The extrusion assembly 13 comprises a hollow body 24 which can be inserted like a drawer into a mating aperture 25 on one side of the box-like structure 11.

To this end, the aperture 25 is equipped with protruding guide elements 27 (FIG. 2) suitable to co-operate with mating grooves, which are not visible in the drawings, provided on the bottom of the hollow body 24.

The hollow body 24 is suitable to contain a feeding screw 32, driven in rotation by the horizontal shaft 15, and is equipped, at the upper rear part, with an inlet aperture 28 and, at the front part, with an outlet aperture 29.

When both the mixing assembly 12 and the extrusion assembly 13 are associated with the box-like structure 11, the inlet aperture 28 aligns with the outlet aperture 26 of the receptacle 16 to allow the dough to be progressively transferred from the receptacle 16 to the hollow body 24.

According to one characteristic of the invention, the aperture 26 has a protruding edge 34 on the perimeter suitable to be inserted into the aperture 28 so as to ensure an air-tight coupling between the apertures 26 and 28 and hence to prevent the spillage of portions of dough as it passes from the mixing assembly 12 to the extrusion assembly 13.

The aperture 26 also has a raised segment 36 on the perimeter edge facing towards the inside of the receptacle 16 suitable to allow the dough produced in the receptacle 16 to be completely discharged, as will be described hereafter.

The outlet aperture 26 of the receptacle 16 and the inlet aperture 28 of the hollow body 24 can be temporarily separated by means of a sliding shutter 33.

The shutter 33 is removed by the user only when the dough contained in the receptacle 16 is suitable to be extruded.

The outlet aperture 29 is threaded on the outside to allow a ring nut 30 suitable to retain an interchangeable extruder 31 to be clamped.

The dough produced is conveyed and pushed by the feeding screw 32 against the extruder 31 from which the extruded dough emerges in the form of pasta of the type and shape desired.

According to one characteristic of the invention, the mixing organ 18 comprises an elongated body 37 equipped with several radial blades arranged at various heights, each of which has a specific function.

With reference to FIG. 3, there are three radial blades, respectively the first 41, the second 42, the third 43 and the fourth 44; the first three are of the fixed type and the fourth is of the elastically movable type.

The first 41 and the second 42 blades are substantially identical and provided respectively in correspondence with the upper end and the center line of the elongated body 37.

These blades 41 and 42 have a transverse section like a flattened hexagon, are inclined at an acute angle in the direction of rotation of the mixing organ 18, in this case anti-clockwise, and their function is to amalgamate the various ingredients of the dough.

The third blade 43, provided substantially in correspondence with the lower end of the elongated body 37, is wedge-shaped and suitable to remove from the bottom of the receptacle 16 any dough which might adhere thereto, thus facilitating the operations to prepare the dough and transfer it to the extrusion assembly 13.

The dough is transferred by the fourth blade 44, which is suitable to push the dough downwards, through the aligned apertures 26 and 28, into the extrusion assembly 13.

To this purpose, the fourth blade 44 is elastically associated with the extended body 37 and has a lower surface 144 (FIG. 4) substantially plane and inclined with respect to the bottom of the receptacle 16.

As shown in FIG. 5, the blade 44 has a cavity 45 suitable to accommodate a radial pin 38 made in a single piece with the elongated body 37.

A sealing ring 47 is inserted on the radial pin 38 and is suitable to ensure an air-tight coupling to prevent infiltrations of food substances into the cavity 45.

The end segment 138 of the radial pin 38 has a reduced section suitable to allow a helical torsion spring 40 to be inserted.

A first end 140 of the spring 40 is suitable to be inserted in a mating dead hole 46 on the radial pin 38 and, after the spring 40 has been loaded as shown by a line of dashes in FIG. 5, the second end 240 is made to co-operate with the lower wall of the cavity 45.

The spring 40, and thus the blade 44, is maintained in position by an attachment element 48, in this case a screw 48a and a washer 48b, suitable to be inserted and clamped in a mating threaded hole 39.

When the blade 44 has been assembled, the cavity 45 is closed from outside with a cover 49 suitable to ensure a perfect air-tight seal to prevent infiltrations of food substances into the cavity 45.

The blade 44 thus structured is suitable to oscillate around the radial pin 38 to move from a lowered position, defined by an abutment element 50, to a plurality of raised positions, indicated in FIG. 4 by a line of dashes.

This allows the blade 44 to progressively push all the dough into the extrusion assembly 13 and to adapt with its movements to the profile presented by the bottom of the receptacle 16 and in particular to help the dough to pass over the raised segment 36 of the outlet aperture 26.

According to another characteristic of the invention, the cover 17, shown in detail in FIGS. 6 and 7, is equipped with an aperture 51 through which ingredients are introduced, defined at the upper part by vertical walls 52 protruding ifs from the profile of the cover 17.

The vertical walls 52, together with one wall of the bottom 53 which is inclined towards the inside and concave towards the outside of the receptacle 16, define a chamber for loading the ingredients.

The bottom wall 53, in co-operation with an upper wall 54 which is concave towards the inside of the receptacle 16, defines in turn a conveyor channel 55 directed in the direction of rotation of the mixing organ 18.

The aperture 51 thus defined prevents the accidental spillage of ingredients from the cover 17 when the apparatus 10 is in use.

According to a further characteristic of the invention, the steps to assemble the mixing assembly 12 and extrusion assembly 13 to the box-like structure 11 must follow a predefined logical order suitable to prevent malfunctioning and risks for the user.

These assembly steps are extremely simple and intuitive and provide first of all that the hollow body 24 is inserted laterally into the guide elements 27 and pushed to the bottom of the aperture 25.

At this point the feeding screw 32 is inserted, through the aperture 29, inside the hollow body 24 until its rear end is inserted into the horizontal shaft 15, after which the desired extruder 31 is coupled with the aperture 29 by tightening the ring nut 30.

Subsequently, the receptacle 16 is inserted into the aperture 20 so that the protruding edge 34 of the aperture 26 is inserted into the aperture 28 and the protruding element 35 into a mating cavity 56 (FIG. 2) provided in the upper front part of the hollow body 24.

At this point it is possible to assemble the mixing organ 18 by inserting it onto the shaft 14 and rotating it slightly until it reaches the stop position, then the knob 19 is clamped and the cover 17 is closed. To dismantle the mixing assembly 12 and extrusion assembly 13 it is necessary to follow the same procedure in reverse.

Modifications and additions may obviously be made to the invention, but these shall remain within the field and scope thereof.

For example, the mixing organ 18 may include more or less than four blades. Moreover, the mixing organ 18 may be attached to the shaft 14 by using alternative solutions other than the knob 19, such as bayonets, lock-in systems or similar.

Or the shutter 33, instead of being an autonomous element, may be directly constrained to the box-like structure 11.

I claim:

1. Apparatus to produce pasta comprising a box-like structure (11), a mixing assembly (12) and an extrusion assembly (13), said mixing assembly (12) comprising a receptacle (16) inside which a mixing organ (18) is commanded to rotate, said extrusion assembly (13) comprising at least a hollow body (24) able to accommodate a feeding screw (32) and an interchangeable extruder (31), said mixing assembly (12) and said extrusion assembly (13) being suitable to be assembled in a removable manner on the box-like structure (11), said mixing assembly (12) being equipped with an outlet aperture (26) suitable to couple in an air-tight manner with an inlet aperture (28) of said extrusion assembly (13), said box-like structure (11) including an open upper compartment (20) suitable to accommodate said mixing assembly (12) and an open lateral compartment (25) suitable to accommodate said extrusion assembly (13) below said mixing assembly (12), said upper (20) and lateral (25) compartments being inter-communicating in correspondence with the zone where said outlet (26) and inlet (28) apertures couple, said lateral compartment (25) including a bottom comprising guide means (27) suitable to cooperate with mating guide means provided on a base of said hollow body (24), characterized in that said open upper compartment (20) comprises an inner wall provided of guide and centering means (21) extending substantially along the entire height of said inner wall, said guide and centering means (21) being suitable to cooperate with mating guide means (22) provided on an external wall of said receptacle (16) and extending substantially along the entire height of said external wall, in that said receptacle (16) is provided on its external wall of a protruding element (23) suitable to be inserted into a mating shaping of said compartment (20), and in that said mixing assembly (12) is equipped with a protruding element (35) made on the bottom of said receptacle (16) and suitable to be automatically inserted, upon the complete insertion of said receptacle (16) in said compartment (20), into a mating hole (56) made on the upper part of said hollow body (24) for lock this hollow body (24) on respect of this receptacle (16).

2. Apparatus as in claim 1, characterized in that said mixing organ (18) consists of an elongated body (37) suitable to be keyed onto a drive shaft (14) in a removable manner and equipped with several radial blades, respectively a first (41) and a second (42) blade provided in correspondence with an upper part and a center line of said elongated body (37) with the function of mixing and amalgamating the ingredients, a third blade (43) provided in correspondence with a lower part of said elongated body (37) with the function of scraping the dough from the bottom of the receptacle (16) and an elastically movable fourth blade (44) with the function of pushing the dough towards said outlet aperture (26).

3. Apparatus as in claim 2, characterized in that said fourth blade (44) has a lowered position in which at least its rear profile is pressed against the bottom of said receptacle (16) and a plurality of raised positions in which said rear profile is raised with respect to said bottom, said lowered position being defined by an abutment element (50) made on said elongated body (37) and protruding therefrom.

4. Apparatus as in claim 3, characterized in that said fourth blade (44) is defined by a shaped body with an external profile defining a lower surface (144) inclined with respect to the bottom of said receptacle (16), said shaped body being equipped with an axial cavity (45) inside which a radial pin (38) is suitable to be inserted solid with the elongated body (37), a spring (40) being constrained to a wall of the cavity (45) and to the pin (38) to allow the shaped body to oscillate elastically around said pin (38).

5. Apparatus as in claim 4, characterized in that said spring (40) is of the torsion type, is keyed onto the pin (38) and held there by an attachment element (48) inserted and clamped in a hole (39) made axially on said pin (38).

6. Apparatus as in claim 4, characterized in that said cavity (45) is closed, at a first end facing towards said elongated body (37), by a sealing ring (47) coaxial to said pin (37) and, at the end facing the outside, by a cover (49) substantially mating in shape with the transverse section of said cavity (45).

7. Apparatus as in claim 1, characterized in that the bottom of said open lateral compartment (25) comprises at least a raised segment (36) around said outlet aperture (26) suitable to co-operate with said rear profile of said fourth blade (44) to convey the dough taken by the latter into the aperture (26).

8. Apparatus as in claim 1, characterized in that said receptacle (16) is closed at its upper part by a cover (17) equipped with an aperture (51) through which the ingredients are introduced, said aperture (51) being defined by vertical walls (52) protruding inside the receptacle (16), a bottom wall (53) and an upper wall, said vertical walls (52), bottom wall (53) and upper wall (54) defining a conveyor channel (55) for said ingredients directed in the direction of rotation of the mixing organ (18).

* * * * *